No. 609,646. Patented Aug. 23, 1898.
O. B. WHITNEY.
CAR BRAKE AND FENDER.
(Application filed Jan. 12, 1898.)
(No Model.) 2 Sheets—Sheet 1.
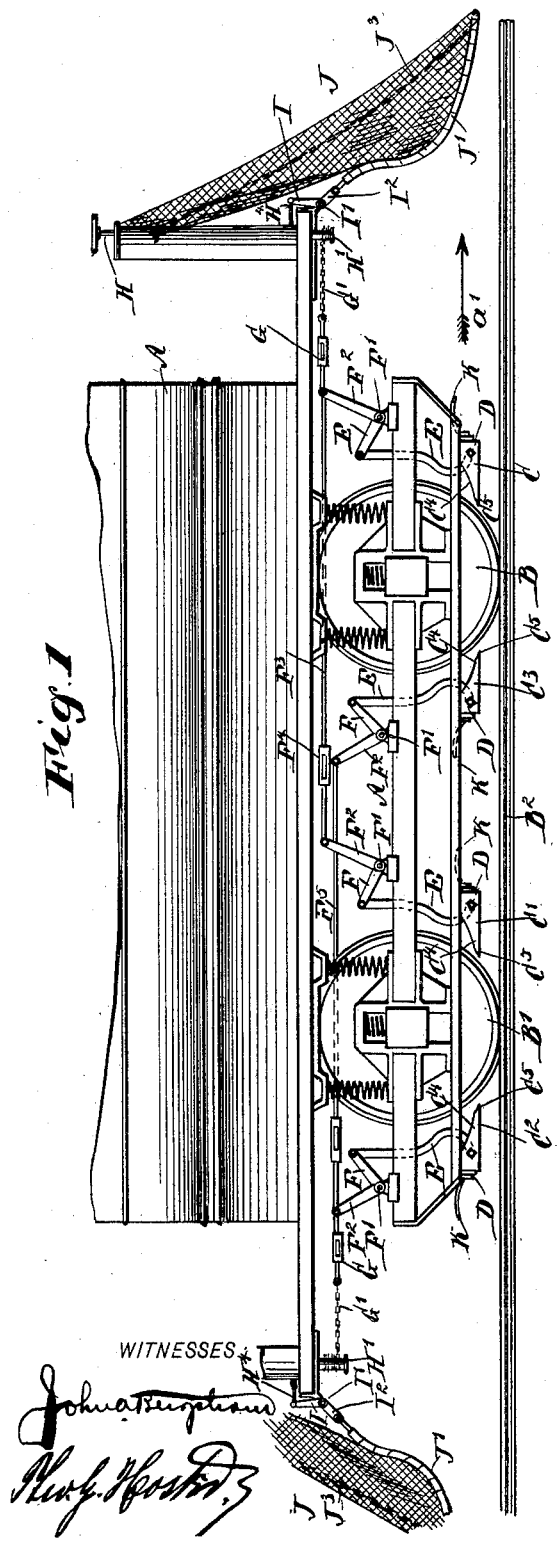
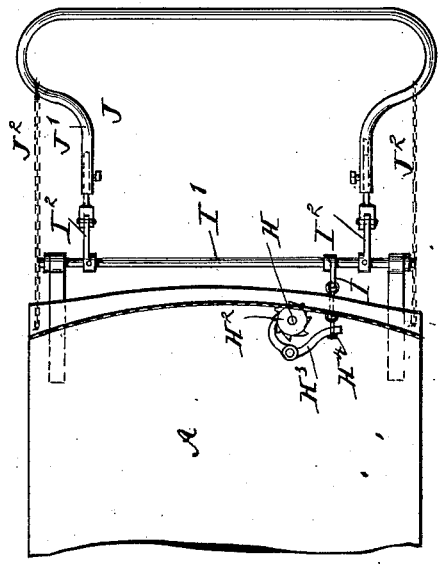
WITNESSES
INVENTOR
O. B. Whitney.
BY
ATTORNEYS.
THE NORRIS PETERS CO., PHOTO-LITHO., WASHINGTON, D. C.

No. 609,646. Patented Aug. 23, 1898.
O. B. WHITNEY.
CAR BRAKE AND FENDER.
(Application filed Jan. 12, 1898.)
(No Model.) 2 Sheets—Sheet 2.
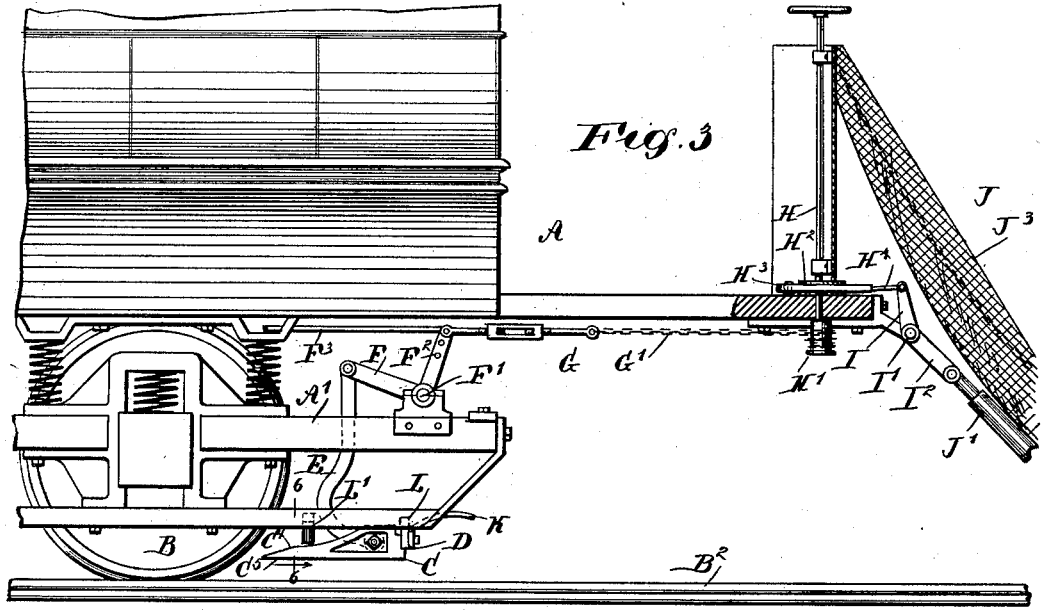
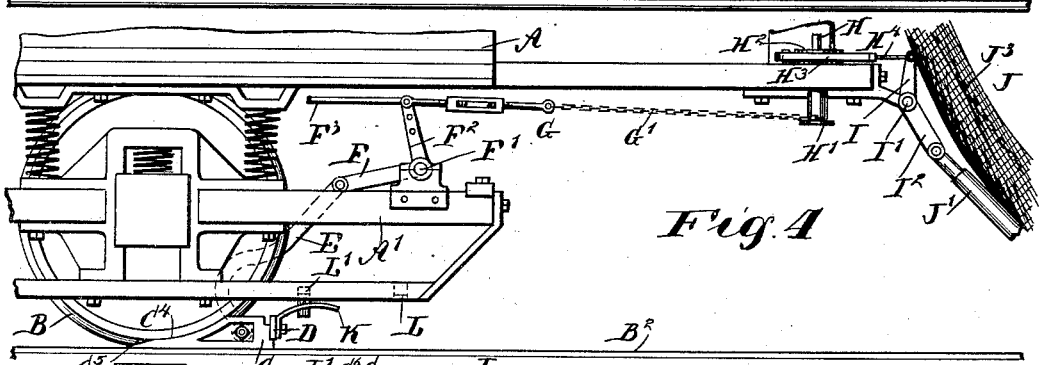
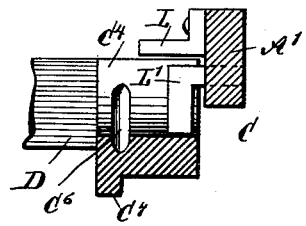
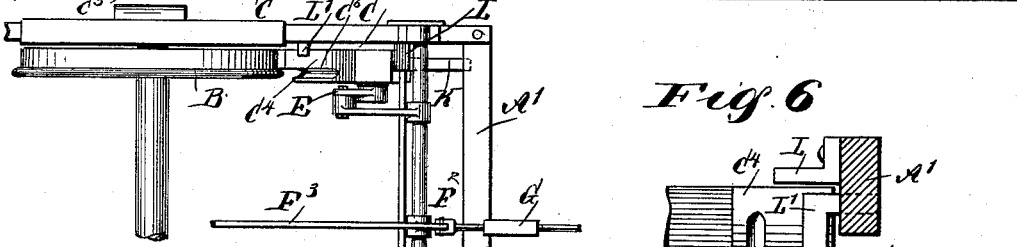
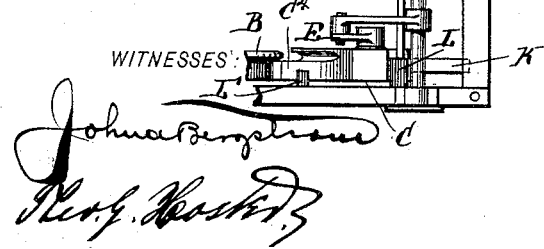
WITNESSES:
INVENTOR
O. B. Whitney
BY Munn & Co.
ATTORNEYS.

UNITED STATES PATENT OFFICE.

OLIVER BUCKLEY WHITNEY, OF MARLBOROUGH, NEW YORK.

CAR BRAKE AND FENDER.

SPECIFICATION forming part of Letters Patent No. 609,646, dated August 23, 1898.

Application filed January 12, 1898. Serial No. 666,456. (No model.)

*To all whom it may concern:*

Be it known that I, OLIVER BUCKLEY WHITNEY, of Marlborough, in the county of Ulster and State of New York, have invented a new and Improved Car Brake and Fender, of which the following is a full, clear, and exact description.

The object of the invention is to provide a new and improved car brake and fender, more especially designed for a surface car, and which is simple and durable in construction, easily manipulated, and arranged to bring the car almost instantly to a standstill, either at the option of the driver or when an obstruction passes into the fender.

The invention consists of novel features and parts and combinations of the same, as will be hereinafter fully described, and pointed out in the claims.

Reference is to be had to the accompanying drawings, forming a part of this specification, in which similar characters of reference indicate corresponding parts in all the figures.

Figure 1 is a side elevation of the improvement as applied. Fig. 2 is a sectional plan view of part of the improvement with the fender-netting removed. Fig. 3 is an enlarged side elevation of the improvement as applied and with parts in section, the brake-shoes being shown out of action. Fig. 4 is a like view of the same with the brake-shoes in action. Fig. 5 is a plan view of the same with the car-body removed, and Fig. 6 is an enlarged transverse section of the improvement on the line 6 6 of Fig. 3.

The car A on which the improvement is applied is provided with the usual front wheels B and the rear wheels B', traveling on rails $B^2$ and adapted to be engaged by pairs of brake-shoes C C' and $C^2$ $C^3$, of which the pairs of brake-shoes C C' are connected with each other and actuated in unison by a mechanism from the front end of the car when the latter travels forward in the direction of the arrow $a'$. The similarly-connected pairs of brake-shoes $C^2$ $C^3$ are located on the opposite sides of the wheels and are actuated from the other end of the car and used when the car travels in the inverse direction of the arrow $a'$. The two brake-shoes of each pair are rigidly connected with each other by a crossbar D, and each brake-shoe is formed with a straight bottom surface adapted to rest on the top of the corresponding rail $B^2$, and the shoe is also formed with a segmental top surface $C^4$, terminating in a point $C^5$ and following the contour of the tread of the corresponding car-wheel, so that the wheel can run upon the said surface at the time the straight bottom is resting on the rail $B^2$, as illustrated in Fig. 4.

The inner portion of each shoe C is formed with a recess or groove $C^6$ for the flange of the car-wheel to pass into at the time the tread engages the segmental surface $C^4$, so that the car-wheel snugly fits upon the shoe and prevents the car-wheel from rotating at the time the brakes are applied, as indicated in Fig. 4, it being understood that in this case the shoe is interposed between the rail and the car-wheel. A flange $C^7$ extends downwardly from the straight bottom surface to abut against the inside of the rail-head at the time the shoe is applied to prevent lateral movement of the two rigidly-connected shoes.

Each of the brake-shoes is hung on a link E, extending upwardly, and the two links E of each pair of brake-shoes are pivotally connected with arms F, secured on a transverse shaft F', journaled in suitable bearings on the frame A' of the truck. Thus four such shafts F' are provided for the car shown in Fig. 1, and each shaft is provided with an arm $F^2$, standing at an angle to the arm F. The arms $F^2$ for the brake-shoes C C' are connected with each other by a link $F^3$, having a turnbuckle $F^4$, and a similar link $F^5$ connects the arms for the brake-shoes $C^2$ $C^3$ with each other. The arms $F^2$ for the brake-shoes C $C^2$ are each also pivotally connected with a link G, made in sections with a turnbuckle and connected by a chain G' with the drum H' of the staff H, journaled in suitable bearings on the corresponding dashboard for the front and rear platform of the car, to be under the control of the driver or motorman in charge of the car. The arms F and $F^2$ and the shaft F' for each pair of brake-shoes form bell-crank levers for raising the said brake-shoes into a normal upper inactive position, as shown in Figs. 1 and 3, and for lowering the said shoes down upon the rails $B^2$ in advance of the wheels, so that the latter can run up on the shoes upon a further forward movement af the car, as shown in Fig. 4.

It is understood that when the operator releases the staff H the weight of the shoes and links E will cause a sudden drop of the shoes to bring the latter to rest on the top of the rails B² a distance in advance of the car-wheels, and as the link E and the connection of the bell-crank lever with the flexible connection leading to the brake-staff allows the shoes C to rest momentarily on the rails it is evident that the advancing car-wheels B B' readily travel up on the shoes, as shown in Fig. 4, to effectually brake the car, the links E and the bell-crank lever assuming the position shown in Fig. 4.

Each staff H is provided with a toothed wheel H² and a pawl H³ for engaging and locking the said wheel, and each pawl is fulcrumed on the car-platform under the control of the operator's foot to permit of releasing the staff and applying the brakes, as above described. The pawl H³ is connected by a link H⁴ with an arm I, extending upward from a shaft I', journaled in suitable bearings on the end of the car and forming part of the car-fender J. The latter is provided with a suitable U-shaped frame J', hung on arms I², extending from the shaft I' on an angle to the arm I. The sides of the frame J' at the outer end thereof are carried by chains J², attached to the upper portion of the dashboard, and in the said frame is arranged a netting or basket, likewise extending up to the top of the dashboard.

Now in case a person is struck by the advancing car and falls into the netting then the weight of the person causes a downward swinging of the frame with the fulcrum at the chain connection. The swinging motion of the frame J' causes a turning of the shaft I' and a pull on the link H⁴, so that the pawl H³ is drawn out of mesh with the toothed wheel H², and the staff is released automatically and an application of the brakes immediately follows, as above explained, to bring the car almost instantly to a standstill after the accident happens. The brake mechanism is thus under the control of the operator, and is also applied automatically when a person or other obstruction passes into the netting. The connection between the pawl H³ and the fender J is such that the operator can readily open the pawl with his foot for releasing the brakes whenever desired.

On the forward end of each brake-shoe C is secured a forwardly-extending and somewhat-curved arm K, adapted to engage a stop L, secured to the truck-frame A' for guiding the shoe in its upward movement by the arm passing under the said stop, the rear end of the shoe engaging a second stop L', likewise secured to the frame A', but out of the path of the arm K. Thus when the car has been brought to a standstill and has run off the shoes C by the car backing a short distance then the operator, on turning the brake-staff H and winding up the chain G', causes a swinging motion of the bell-crank lever to move the shoes into an uppermost position. The shoes as soon as lifted off the rails B² commence to swing forwardly, owing to the position of the links E, so that the arms I are brought under the stops L, and a further winding up of the chain G' causes a further forward sliding of the brake-shoes C, the arms guiding the shoes forwardly under the stops L until the latter rest on the top of the cross-bar D, as shown in Fig. 3. At that time the rear ends of the shoes C engage the stops L', so that the shoes are firmly held against the said stops, as shown in Fig. 3, and are suspended above the rails and a distance in advance of the car-wheels.

It is understood that when the brake-staff H is released the shoes C drop straight down to the rails and come to a rest thereon, and then the advancing car-wheels run up the shoes and stop the car almost instantly.

On a four-wheel truck I prefer to employ eight shoes for working each way, so that the car is completely moved off the rails onto the corresponding four shoes applied at the time.

Having thus fully described my invention, I claim as new and desire to secure by Letters Patent—

1. A car brake and fender, comprising a brake-shoe adapted to pass between a rail and a wheel, a brake-staff connected with the said shoe, for holding the latter normally in an inactive raised position, and a car-fender connected with the said brake-staff, for releasing the same automatically and applying the brakes when an obstruction passes into the fender, substantially as shown and described.

2. A car brake and fender, comprising a brake-shoe adapted to pass between a rail and a wheel, a link for carrying the shoe normally in the path of and out of contact with the wheel, a brake-staff having connection with the said link, a locking device for the said brake-staff, and a fender connecting with the said locking device, to open the latter automatically to release the staff when an obstruction passes into the fender, substantially as shown and described.

3. A car-brake, provided with a shoe adapted to pass between a wheel and a rail, a link for carrying the shoe normally in the path of and out of contact with the wheel, and arranged to allow the shoe to move down into a resting position on the track in advance of the wheel, to allow the latter to run onto the shoe, a spring-arm extending forwardly from the shoe, and fixed stops on the car-frame for holding the shoe in place, one of the stops being adapted to be engaged by the said arm to guide the shoe forward and upward to a normal, inactive position, substantially as shown and described.

OLIVER BUCKLEY WHITNEY.

Witnesses:
  MARIE A. TURNEY,
  N. D. B. WHITNEY.